Sept. 16, 1958    H. N. FAIRBANKS    2,852,153
STEREO MOUNTING DEVICE
Filed May 7, 1956    3 Sheets-Sheet 1
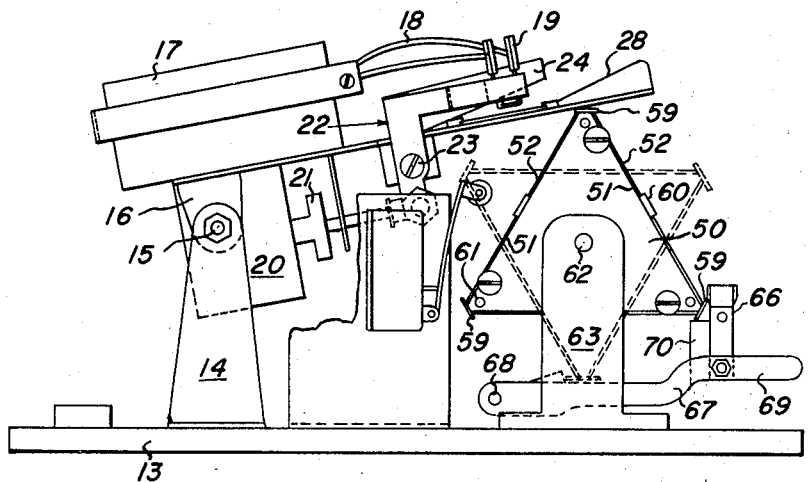
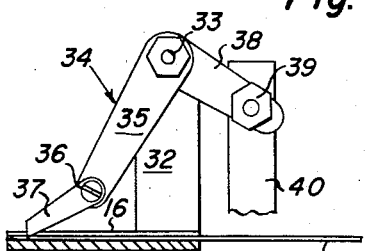
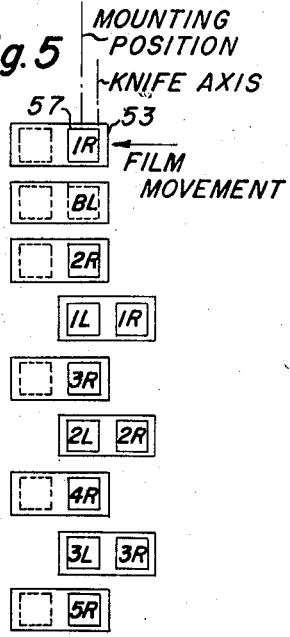
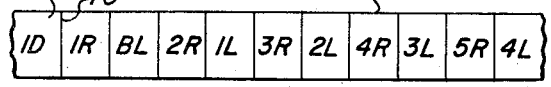
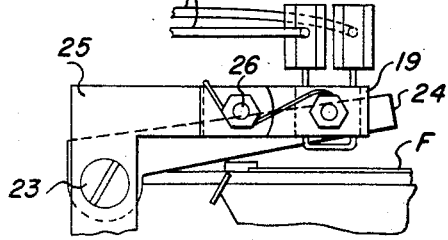
HENRY N. FAIRBANKS
INVENTOR.
BY
ATTORNEYS Sept. 16, 1958 H. N. FAIRBANKS 2,852,153
STEREO MOUNTING DEVICE
Filed May 7, 1956 3 Sheets-Sheet 2

HENRY N. FAIRBANKS
INVENTOR.
BY
ATTORNEYS

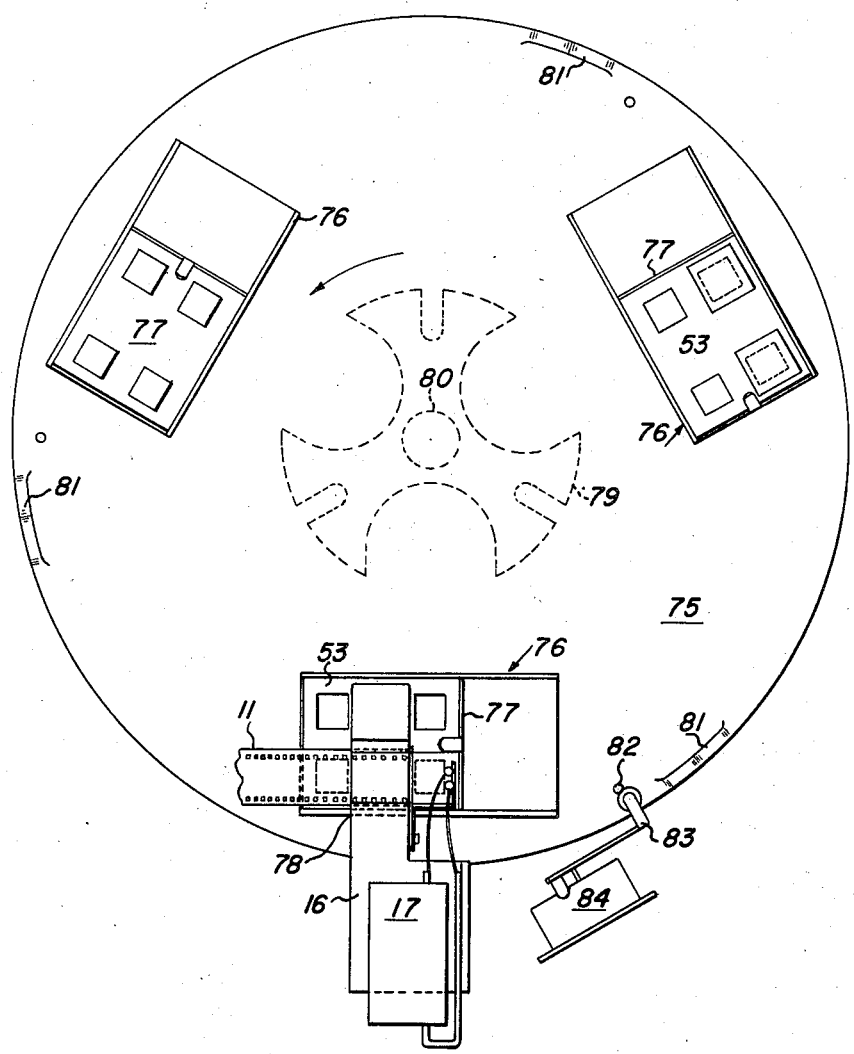

United States Patent Office 2,852,153
Patented Sept. 16, 1958

2,852,153
STEREO MOUNTING DEVICE
Henry N. Fairbanks, Rochester, N. Y., assignor to Eastman Kodak Company, Rochester, N. Y., a corporation of New Jersey
Application May 7, 1956, Serial No. 583,003
17 Claims. (Cl. 216—29)

The present invention relates to a film mounting apparatus, and more particularly to a machine for severing pairs of stereo images from a film strip and mounting the individually severed images on a mount in proper aligned and stereo relation.

As is well known, stereo transparencies are formed by making simultaneously a pair of exposures with a double lens camera, the lenses of which are spaced a definite distance apart. Due to the spacing of the camera lenses, the two images forming a stereo pair are not adjacent, but are spaced along the film strip, as shown in Fig. 1 and later to be more fully described. The various separate film strips may be processed individually, or as is common practice, they may be connected and wound into a large roll and processed as a group. After processing, the film strip, either separately or in a roll, is fed along a film guide to a severing mechanism which successively severs the individual image areas from the strip. The image areas of each stereo pair are then arranged on a mount in aligned and stereo relation, the mount usually being formed from a sheet of cardboard and provided with aligned apertures with which the pairs of stereo images are registered, as is well known.

Prior to the present invention, the mounting of the stereo image was usually performed manually and was, therefore, time-consuming and costly. In order to overcome these disadvantages the present invention provides a machine which, although not automatic in its operation, greatly facilitates the mounting of the severed images on the mount in aligned and stereo relation. To secure this result, the first image area of the first pair of images is severed from the strip and heat tacked in position over the proper aperture of the mount. However, due to the spacing of the individual image areas of a pair of stereo images along the film strip, after one area has been severed and tacked, other intermediate areas of other pairs must be severed and tacked in proper relation to the different mounts. Then the second area of the original pair is then severed and tacked to the initial mount to cooperate with the previously tacked area to provide the proper pair of aligned stereo images.

To secure the proper mounting of the various pairs of stereo images on the proper mounts, the present invention provides a new and improved movable platen provided with a plurality of loading stations each of which has a slidable holder on which the stereo mount is positioned. The platen is rotated so as to bring the stations successively into alignment with the film strip, and this platen rotation combined with the sliding of the mount holder serves to position the successive mounts to receive the severed images in proper order and relation, the advantages of which are deemed apparent.

The present invention has as its principal object the provision of a novel stereo mounting device.

Another object of the invention is the provision of such a device by which the image areas of a pair of stereo images are arranged and secured to a mount in proper aligned and stereo relation.

Another object of the invention is the provision of a novel movable platen which moves in a definite relation to carry the stereo mounts and to position the mounts to receive the stereo image areas.

Yet another object of the invention is the provision of arrangements by which the image area tacking and severing means are controlled from the movable platen and in a definite timed relation thereto and to each other.

To these and other ends the invention resides in certain improvements and combinations of parts all as will be hereinafter more fully described, the novel features being pointed out in the claims at the end of the specification.

In the drawings:

Fig. 1 is a view of a film strip showing the arrangement of the pairs of stereo images thereon;

Fig. 3 is a side elevation view of the device of the present invention showing the platen in an intermediate position and held releasably in said position;

Fig. 4 is a partial view of the mechanism illustrated in Figs. 2 and 3, showing the film feeding device;

Fig. 5 is a diagrammatic view showing the various positions of the mounts to receive the stereo image areas, only the image receiving areas of the mounts are shown;

Fig. 6 is a partial view of the structure in Fig. 3 showing the relation of the tacker and film severing means; and Fig. 7 is a view of a modified form of movable platen, showing the relation thereto of the other parts of the device.

Similar reference numerals throughout the various views indicate the same parts.

Figure 2:
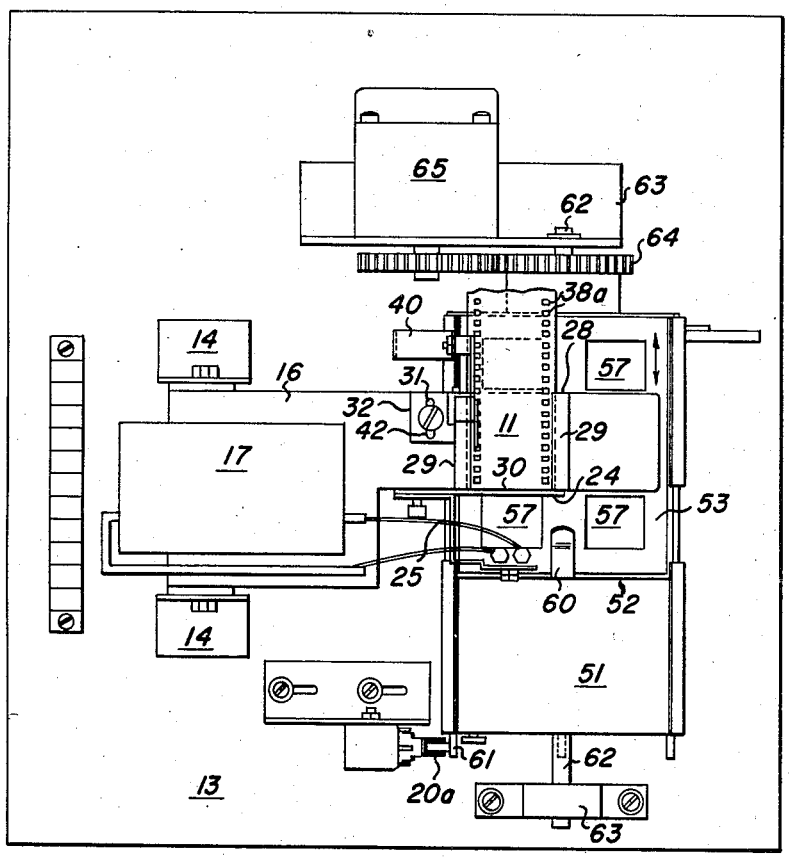
Fig. 2 is a plan view of the device of the present invention, showing the relation of the parts.

As mentioned above, after the stereo film is exposed, it is processed and the images are arranged along the film strip as shown in Fig. 1. The trailing end of the film strip 11 is provided with what may be called an identifying tab or section 12. It will be noted from this figure that the corresponding pairs of image areas are spaced three image areas apart. It will also be noted that a blank area "B1" is positioned between the first image area 1R of the first group and a second image area 2R of the second group, which arrangement is common and well known in stereo films. After the film strip has been processed it is edge coated with a vinyl heat seal application before it is placed in the machine of the present invention. This coating allows the film to be tacked in place on the cardboard mount, as will be later described. This particular form of vinyl heat seal forms no part of the present invention, and is not shown or described.

The machine of the present invention comprises a base 13 on which are mounted a pair of upstanding members 14 to the top of which is pivoted a rockable mount at 15, a bracket broadly designated by the numeral 16. This bracket carries a heating coil 17 which is connected by leads 18 to a tacker 19 to be later more fully described. The bracket 16 also has suspended therefrom a solenoid 20 the armature 21 of which is connected to a bell crank 22 pivoted at 23 on the bracket. The horizontal arm 24 of the bell crank constitutes a knife which cooperates with the stationary element to be later described to sever the film area. The heating coil 17 and the solenoid 20 may be connected in any suitable and well known way to an electric outlet. An electric switch 20a, to be later described, is connected into the circuit of the solenoid 20. A member 25 is secured to pivot 23 and is Z-shaped in plan and has pivoted thereto at 26 an arm or lever which carries the tacker 19. This tacker 19 is rockable on the member 25. This arrangement is provided so that when the solenoid 20 is energized both the bell crank 22 and the member 25 are rocked clockwise about pivot 23 as viewed in Figs. 3 and 6. Such movement will move the tacker 19 and knife 24 downward. However, the tacker is lowered slightly in advance of the knife so that the image area is first tacked in position on the mount.

Then, after the image has been tacked, the knife will move downward to cut the strip to sever the tacked area. The pivot 26 allows the knife 24 to move downward relative to the tacker 19. The bracket 16 is also formed with a film guide 28 along which the film strip 11 is moved, as clearly shown in Fig. 2. This guide is provided with a pair of spaced guide strips 29 which engage the opposite edges of the film strip. An edge 30 of the guide 28 is positioned below the knife 24, and provides a stationary member which cooperates with the knife 24 to cut or sever the individual film areas. The bracket 16 has secured thereto by means of a screw 31 an L-shaped arm 32 the upper end of which has pivoted at 33 a bell crank 34 one arm 35 of which has pivoted at 36 thereon a pawl 37 adapted to engage in the perforations 38a of the film strip to feed the latter. The other arm 38 of the bell crank is anchored at 39 to the upper end of the member 40 the lower end of which, not shown, is secured to the base 13. The arrangement is such that when the bracket 16 is tilted counterclockwise, as shown in Fig. 3, to be later described, due to the anchoring of the arm 38 at 39 the bell crank 34 will be rocked clockwise as viewed in Fig. 4 to move pawl 37 to the left to feed the film strip the distance of one image area. The horizontal section of the arm 32 is provided with a slot 42 through which screw 31 extends. This slot enables arm 32, and hence bell crank 34 with its pawl 37, to be adjusted to the right or left to frame the edge of an image area with the edge 30 so that as the knife 34 is lowered into coooperating relation with edge 30, the film area will be cut along its frame line, as is deemed apparent.

In order to mount the individual image area of strip 11, the present invention provides a rotatable platen 50 having a plurality of stations 51, in the present instance three. In other words, the present embodiment of platen 50 is triangular in shape, each side 51 of which provides a mounting station. Each side or station also has slidably mounted thereon a flat plate 52 on which is positioned an open stereo mount 53, of well known construction, which is formed from a sheet of cardboard scored along the center line to form a pair of flaps each of which is formed with aligned apertures 57 all of which is known and forms no part of the present invention. Thus, the plate 52 constitutes a movable holder for the stereo mount. The edges or corners of the platen are provided with metal plates 59 which overlie the opposite edges of the plate 52 to position and hold the latter slidably on the face of the platen 50, for a purpose to be later described. One end of each plate 52 is formed with a small clip 60 under which a side edge of the mount 53 is positioned and which cooperates with plates 59 to position the mount on plate 52. Also, clip 60 provides a finger piece by which the plate 52 and mount 53 can be moved along the face or mounting station of platen 50. Each edge of platen 50 is provided with an axially extending pin 61 which engages and operates the switch 20a in a manner and for a purpose to be later described.

The platen is carried by a shaft 62 the ends of which are supported in bearing brackets 63 carried by base 13. One end of the shaft is connected by a gear train 64 to a continuously operating motor 65. A slip clutch or other similar and well known device, not shown, is positioned between the motor 65 and the platen 50 so that the latter may be rotated intermittently from a continuously running motor 65. Now, the triangular platen 50 has three sides 51 each of which constitutes the mounting station and carries a slidable holder 52 on which is positioned a stereo mount 53. When the platen is in the dotted line position, Fig. 3, one face 51 is positioned to receive a holder 52 which is mounted in alignment with the film strip and the film guide 28. In this position, one image area has been fed, as will be later described, past the knife to overlie and register with one of the aligned apertures 57 of the mount 53. When the platen aperture is in this position, one of the pins 61 engages switch 20a to close the circuit to the solenoid 20 and the tacker and knife are lowered, the tacker first engaging a small area of the positioned image to heat tack said area to the mount. After this area is tacked, the knife is lowered to sever the positioned and tacked image area. During the tacking and cutting operation the platen is held in the dotted position shown in Fig. 3, by a lug or pawl 63, which engages one of the edge strips 59. The pawl 63 is secured to or formed on a lever or arm 67 pivoted at 68 on the base 13. Thus, although the motor 65 is running continuously, the platen 50 is held stationary by pawl 63 during the mounting operation. After one image area of the pair has been placed on the mount, the clip 60 is grasped and the holder and its attached mount are slid along and relative to the platen 50 to bring the other aligned aperture 57 into position to receive the next image area of the pair, as will be later described. After the image areas are tacked and secured, the arm 67 is rocked clockwise about its pivot 68 by pressing downward on the free end 69 thereof to move pawl 63 out of holding relation with the edge strip 59 to free the platen 50.

The latter is now moved clockwise, as viewed in Fig. 3, by the motor 65. However, when the apex or edge of the platen comes under the film guide 28, as shown in the solid lines of Fig. 3, the entire bracket 16 is rocked counterclockwise about its pivot 15. The rocking of bracket 16 serves to rock the bell crank 34 clockwise about its pivot 33 to feed the film forward or to the left the distance of one image area. In the solid line position, Fig. 3, a spring-pressed arm 70 carried by arm 66 engages under one edge of the platen 50 to hold the platen. In this relation, the right side or station is positioned so that it is available to the operator so that a filled or completed mount may be removed and a new and empty mount placed on the holder at the exposed right side. After the new mount has been placed in position, end 69 of arm 67 is depressed to disengage arm 70 from plate 59 to free the platen 50 which then continues its clockwise rotation by motor 65 until the platen has again reached its dotted line position, Fig. 3. In this position one of the faces or exposing stations is arranged horizontally and is positioned to receive the severed image area, and the platen is held in this image receiving or mounting position by means of the engagement of a pawl 63 with a plate 59, as indicated in dotted lines, Fig. 3.

Thus, by providing a multi-face platen and with a mount holder slidably mounted on each face, the various mounts may be brought successively into position to receive a pair of image areas in proper aligned and stereo relation. Also, each time platen 50 is rotated a partial revolution to bring one of the sides or stations horizontally into loading position, such rotation causes one of the pins 61 to engage and move switch 20a to energize the solenoid 20. The result is that when the side 51 has been moved to loading position, the film area has been moved and the tacker and knife will be operated to tack and sever the positioned film area.

With the above parts in mind, and referring to Fig. 5, the mounting operation will be described. First, a mount 53 is placed in a holder 52 on each face of the triangular platen 50. The film strip 11 is now placed in position on the film guide 28, and the film is moved down until the frame line 70 between the identifying tab 12 and the image area 1R is in position with the knife 24, and the latter is then actuated manually to sever the tab 12. During this cutting of the tab 12 the platen is in the solid line position, Fig. 3. The platen 50 is then moved ⅙ of a turn clockwise, but nothing happens at this time as the feed claw or pawl 37 is moving to the right, Fig. 4. Now the platen is given a ⅓ rotation clockwise. This movement first feeds the film and brings the next mount station into position and tacks on the mounts the first image area 1R over the right hand aperture 57, the mount and holder being moved all the way out or to the lower side of the mounting station as viewed in the position, Fig. 2. Thus, area 1R is mounted over the right hand aperture 57 of the mount as shown at the top of Fig. 5. The platen is then rotated ⅓ of a turn to the solid line position, Fig. 3, to feed the blank B1 which is then cut by operating the knife manually. At this time the mount with the area 1R is at the right side of the platen, Fig. 5. Now, the additional ⅓ rotation of the platen brings the next mounting station into position but nothing happens at this time because the film claw is moved backwards. The platen is then given an additional ⅓ turn and this moves area 2R into position, and cuts the tacks 2R over the right aperture of the next mount, Fig. 5. At this time 1R and 2R are mounted in separate stereo mounts. A ⅓ rotation of the platen 50 then moves area 1L, cuts and tacks the latter over the left aperture of the first mount, Fig. 5, the mount being in the fourth position, Fig. 5. The film mount with 1L and 1R positioned thereon is removed and an empty mount placed in position, step 4, Fig. 5. An additional rotation then brings an empty mount into position, feeds 3R and tacks the latter on the right aperture of the empty mount, step 5, Fig. 5. In the meantime, the holder and mount with 2R therein is slid to the right, step 6, and the platen is given another ⅓ rotation and 2L is mounted. As the second mount is now filled, it is removed and replaced by an empty mount. This process continues until all the pairs of stereo images are mounted on the proper mount and in proper aligned and stereo relation.

Fig. 7 shows a modified platen arrangement in which the platen is in the form of a flat member or disc 75 rather than triangular, as in the arrangement illustrated in Figs. 1 and 2. This disc 75 has three spaced loading stations 76 at each of which is positioned a slidable holder 77 which may be the same as the holder 52 above described. As each station 76 and its holder is moved into loading position, it comes into alignment with film guide 78 which may be the same as 28 or any other suitable construction. The main point is that the film should be fed over disc 75 so that when an area is fed it will be positioned to be received by a mount. The film guide 78 may be carried by a pivoted bracket which may be identical to bracket 16, above described. The disc 75 has positioned thereon cams 81 which serve to lift bracket 16. Such lifting of the bracket will actuate a film feeding means such as that shown in Fig. 6, and above described. Thus, as each station is moved into position a film area is fed over the mount positioned on the holder 77. A series of pins 82 engages an arm 83 of switch 84 to actuate a solenoid, such as solenoid 20, to actuate a knife, not shown, to sever the fed film area and to operate the tacker to tack a film area on the mount.

The disc 75 may be rotated intermittently from the continuously running motor 65 by any suitable means, such as a Geneva movement, a part of which is shown at 79 carried by the shaft 80 of disc 75. As such movement is well known and forms no part of the present invention, further details are not deemed necessary. Suffice it to say, that by means of this Geneva movement, the disc 75 is stopped automatically at each loading station, so that no auxiliary holding means such as arm 67, Fig. 3, is needed in connection with the disc 75. Thus, disc 75, like platen 50, has three separate loading stations. Furthermore, the sequence of operation of disc 75 is the same as that above described in connection with platen 50.

The present invention thus provides a stereo mounting device which has a three-station platen, each station being provided with a slidable holder on which a stereo mount is positioned. As each station is brought into loading position a film image area is fed, tacked over one of the apertures of the mount, and then severed from the strip. The next station is then brought into position to receive the image area. After one image area has been secured and positioned on the mount, the latter with its holder is moved or slid relative to the station, so that the other or uncovered aperture will be in position to receive the other stereo image of the pair when the partially filled mounted is again brought into loading position. By means of this arrangement, each pair of stereo areas, which are spaced along the strip, are positioned on the mount in proper alignment and stereo relation. The device is novel, rugged, easy to operate and highly effective in use. Also, the mounting requires a minimum of supervision on the part of the operator.

While certain embodiments of the invention have been disclosed, it is to be understood that the inventive idea may be carried out in a number of ways. Therefore, this application is not to be limited to the precise details described, but is intended to cover all variations and modifications thereof which fall within the scope of the appended claims.

What I claim and desire to secure by Letters Patent of the United States is:

1. In a device for mounting pairs of stereo transparencies, the combination with a film strip having pairs of stereo images positioned thereon and on which the image areas of each pair are displaced along the strip, means for feeding the strip the distance of one image area at a time, means to sever successively single image areas from said strip, of a multi-plane platen movable relative to said strip, a plurality of mounting stations arranged on different planes on said platen, each of said stations having positioned thereon a stereo mount formed with a pair of aligned spaced apertures, and means to move said platen to bring said stations and the mounts thereon successively into alignment with said strip to receive the image area of a pair on the positioned mount and over the apertures thereof in proper aligned and stereo relation.

2. In a device for mounting pairs of stereo transparencies, the combination with a film strip having pairs of stereo images positioned thereon and on which the image areas of each pair are displaced along the strip, means for feeding the strip the distance of one image area at a time, means to sever successively single image areas from said strip, a platen movable relative to said strip, means to mount said platen for both rotational and axial movement, a plurality of mounting stations on said platen, a mount holder slidably mounted on said platen at each of said stations and adapted to receive a stereo mount formed with a pair of aligned apertures, and means for moving said platen and holder as a unit relative to said strip and relative to each of the stations to position a holder to receive a pair of image areas on said mount and over the apertures thereof in aligned and stereo relation.

3. In a device for mounting pairs of stereo transparencies, the combination with a film strip having pairs of stereo images positioned thereon and on which the image areas of each pair are displaced along the strip, means for feeding the strip the distance of one image area at a time, means to sever successively single image areas from said strip, of a platen movable relative to said strip, means to mount said platen for both rotational and axial movement, a plurality of mounting stations on said platen, a mount holder slidably mounted on said platen at each of said stations and adapted to receive a stereo mount formed with a pair of aligned apertures, means to move said platen relative to said strip to position one of said stations in alignment therewith, and means to slide the holder relative to the positioned station and to said platen to move the mount thereon into position to receive a pair of image areas in position over the positioned mount apertures and in aligned and stereo relation.

4. In a device for mounting pairs of stereo transparencies, the combination with a film strip having pairs of stereo images positioned thereon and on which the image areas of each pair are displaced along the strip, means for feeding the strip the distance of one image area at a time, means to sever successively single image areas from said strip, of a multi-plane platen movable relative to said strip, a plurality of mounting stations arranged on different planes on said platen, a mount holder slidably mounted on said platen at each of said stations and adapted to receive a stereo mount formed with a pair of aligned apertures, means for moving said platen and holder relative to said strip, and means for positioning said platen with a mount of one of said stations having the apertures thereof in alignment with said strip so that said mount may receive a pair of images over the apertures in aligned and stereo relation.

5. In a device for mounting pairs of stereo transparencies, the combination with a film strip having pairs of stereo images positioned thereon and on which the image areas of each pair are displaced along the strip, means for feeding the strip the distance of one image area at a time, means to sever successively single image areas from said strip, of a platen movable relative to said strip, a plurality of mounting stations on said platen, each of said stations having positioned thereon a stereo mount formed with a pair of aligned spaced apertures, means to move said platen to bring said stations and the mounts thereon successively into alignment with said strip to receive the image area of a pair on the positioned mount and over the apertures thereof in proper aligned and stereo relation, and means controlled by the movement of said platen for actuating said strip severing means in timed relation to the movement of said platen so that a mount will be positioned to receive an image area when the latter is severed from the strip.

6. In a device for mounting pairs of stereo transparencies, the combination with a film strip having pairs of stereo images positioned thereon and on which the image areas of each pair are displaced along the strip, means for feeding the strip the distance of one image area at a time, means to sever successively single image areas from said strip, of a platen movable relative to said strip, means to mount said platen for both rotational and axial movement, a plurality of mounting stations on said platen, a mount holder slidably mounted on said platen at each of said stations and adapted to receive a stereo mount formed with a pair of aligned apertures, means to move said platen to bring said stations successively into position in alignment with said strip, and means to slide the holder at said station relative to said platen to position the mount apertures to receive the images in proper aligned and stereo relation on said mount.

7. In a device for mounting pairs of stereo transparencies, the combination with a film strip having pairs of stereo images positioned thereon and on which the image areas of each pair are displaced along the strip, means for feeding the strip the distance of one image area at a time, means to sever successively single image areas from said strip, of a platen movable relative to said strip, a plurality of mounting stations on said platen, each of said stations having positioned thereon a stereo mount formed with a pair of aligned spaced apertures, means to move said platen to bring said stations and the mounts thereon successively into alignment with said strip to receive the image area of a pair on the positioned mount and over the apertures thereof in proper aligned and stereo relation, and means controlled by the movement of said platen to bring a station into alignment with the strip for actuating said severing means.

8. In a device for mounting pairs of stereo transparencies, the combination with a film strip having pairs of stereo images positioned thereon and on which the image areas of each pair are displaced along the strip, means for feeding the strip the distance of one image area at a time, means to sever successively single image areas from said strip, of a multi-plane platen movable relative to said strip, a plurality of mounting stations arranged on different planes on said platen, each of said stations having positioned thereon a stereo mount formed with a pair of aligned spaced apertures, means to move said platen to bring said stations and the mounts thereon successively into alignment with said strip to receive the image areas of a pair on the positioned mount and over the apertures thereof in proper aligned and stereo relation, means controlled by the movement of said platen to bring a station into alignment with the strip for actuating said severing means, and releasable means for holding said platen to retain a station in image receiving position.

9. In a device for mounting pairs of stereo transparencies, the combination with a film strip having pairs of stereo images positioned thereon and on which the image areas of each pair are displaced along the strip, means for feeding the strip the distance of one image area at a time, means to sever successively single image areas from said strip, of a platen movable relative to said strip, a plurality of mounting stations on said platen, each of said stations having positioned thereon a stereo mount formed with a pair of aligned spaced apertures, means to move said platen to bring said stations and the mounts thereon successively into alignment with said strip to receive the image areas of a pair on the positioned mount and over the apertures thereof in proper aligned and stereo relation and means controlled by the movement of said platen to feed said strip the distance of one image area.

10. In a device for mounting pairs of stereo transparencies, the combination with a film strip having pairs of stereo images positioned thereon and on which the image areas of each pair are displaced along the strip, means for feeding the strip the distance of one image area at a time, means to sever successively single image areas from said strip, of a platen movable relative to said strip, a plurality of mounting stations on said platen, each of said stations having positioned thereon a stereo mount formed with a pair of aligned spaced apertures, means to move said platen to bring said stations and the mounts thereon successively into alignment with said strip to receive the image area of a pair on the positioned mount and over the apertures thereof in proper aligned and stereo relation, means controlled by the movement of said platen to bring a station into alignment with the strip for actuating said severing means, releasable means for holding said platen to retain a station in image receiving position, and means controlled by the movement of said platen to shift the strip the distance of one image area.

11. In a device for mounting pairs of stereo transparencies, the combination with a support, of a bracket pivotally mounted on said support, a film guide carried by said bracket to receive a film strip having pairs of stereo images positioned thereon and on which the image areas of each pair are displaced along the strip, means on said bracket for feeding a single image area at a time, means on said bracket for severing successively single image areas from said strip, a triangular shaped platen rotatably mounted on said support below said film guide, a loading station on each face of said platen, a holder slidably mounted at each station and receiving a stereo mount formed with a pair of aligned spaced apertures, means to rotate said platen to bring the stations successively into alignment with said strip on said guide, means on said support releasably engaging said platen to retain a station and the mount thereon in alignment with said strip so that the mount will receive the image areas of a pair over the apertures thereof in proper aligned and stereo relation, and means controlled by the rotation of said platen to actuate said severing means in timed relation with the rotation of said platen.

12. In a device for mounting a pair of stereo transparencies, the combination with a support, of a bracket pivotally mounted on said support, a film guide carried by said bracket to receive a film strip having pairs of stereo images positioned thereon and on which the image area of each pair are displaced along the strip, means on said bracket for feeding a single image area at a time, means on said bracket for severing successively single image areas from said strip, a triangular shaped platen rotatably mounted on said support below said film guide, a loading station on each face of said platen, a holder slidably mounted at each station and receiving a stereo mount formed with a pair of aligned spaced apertures, means to rotate said platen to bring the stations successively into alignment with said strip on said guide, means on said support releasably engaging said platen to retain a station and the mount thereon in alignment with said strip, so that the mount will receive the image areas of a pair over the apertures thereof in proper aligned and stereo relation, means to tack the individual image areas over the proper apertures in said mount, and means controlled by the rotation of said platen to actuate said tacking and severing means in a definite timed relation.

13. In a device for mounting a pair of stereo transparencies, the combination with a support, of a bracket pivotally mounted on said support, a film guide carried by said bracket to receive a film strip having pairs of stereo images positioned thereon and on which the image areas of each pair are displaced along the strip, means on said bracket for feeding a single image area at a time, means on said bracket for severing successively single image areas from said strip, a triangular shaped platen rotatably mounted on said support below said film guide, a loading station on each face of said platen, a holder slidably mounted at each station and receiving a stereo mount formed with a pair of aligned spaced apertures, means to rotate said platen to bring the stations successively into alignment with said strip on said guide, means on said support releasably engaging said platen to retain a station and the mount thereon in alignment with said strip so that the mount will receive the image areas of a pair over the apertures thereof in proper aligned and stereo relation, means to tack the individual image areas over the proper apertures in said mount, and means controlled by the rotation of said platen to actuate said film feeding means to feed an image area and to actuate said tacking and severing means in a definite timed relation.

14. In a device for mounting a pair of stereo transparencies, the combination with a support, of a bracket pivotally mounted on said support, a film guide carried by said bracket to receive a film strip having pairs of stereo images positioned thereon and on which the image areas of each pair are displaced along the strip, means on said bracket for feeding a single image area at a time, means on said bracket for severing successively single image areas from said strip, a triangular shaped platen rotatably mounted on said support below said film guide, a loading station on each face of said platen, a holder slidably mounted at each station and receiving a stereo mount formed with a pair of aligned spaced apertures, means to rotate said platen to bring the stations successively into alignment with said strip on said guide, means on said support releasably engaging said platen to retain a station and the mount thereon in alignment with said strip so that the mount will receive the image areas of a pair over the apertures thereof in proper aligned and stereo relation, means to tack the individual image areas over the proper apertures in said mount, the rocking of said platen serving to bring an edge thereof under said film guide to rock said bracket about its pivot, said rocking automatically operating said feeding means to feed said strip the distance of one image area, and means controlled by the rotation of said platen to actuate said tacking and severing means in a definite timed relation.

15. In a device for mounting pairs of stereo transparencies, the combination with a support, of a bracket pivotally mounted on said support, a film guide carried by said bracket to receive a film strip having pairs of stereo images positioned thereon and on which the image areas of each pair are displaced along the strip, means on said bracket for feeding a single image area at a time, means on said bracket for severing successively single image areas from said strip, a triangular shaped platen rotatably mounted on said support below said guide, a loading station on each face of said platen, a holder slidably mounted at each station and having positioned thereon a stereo mount formed with a pair of aligned apertures, means to rotate said platen intermittently to bring the stations successively into alignment with said strip on said guide, means on said support releasably engaging said platen to hold a station and the mount thereon in image receiving position so that the images of a pair will be positioned over the mount apertures in proper aligned and stereo relation, means adjacent said guide to tack an image area on said mount and over an aperture thereof, and means controlled by the rotation of said platen to actuate said tacker and severing means in timed relation such that the image area is first tacked in position on the mount and over an aperture thereof and then the tacked area is severed from the strip.

16. In a device for mounting pairs of stereo transparencies, the combination with a support, of a film guide carried by said support to receive a film strip having pairs of stereo images positioned thereon and on which the image areas of each pair are displaced along the strip, means associated with said guide for feeding said strip therealong one image area at a time, a rotatable disc carried by said support below said guide, a plurality of loading stations arranged in spaced relation on said disc, a holder slidably mounted on said disc at each of said stations to receive a stereo mount formed with a pair of aligned spaced apertures, means to rotate said disc intermittently to bring said stations successively into aligned relation with said guide to receive the severed transparencies which are positioned on the mount at said stations in proper aligned and stereo relation, means to hold said disc releasably in position when a station is in image receiving position, means controlled by the rotation of said disc to actuate said feeding means to feed an image area, and means controlled by said disc for actuating said feeding means to sever the fed image area.

17. In a device for mounting pairs of stereo transparencies, the combination with a support, of a film guide carried by said support to receive a film strip having pairs of stereo images positioned thereon and on which the image areas of each pair are displaced along the strip, means associated with said guide for feeding said strip therealong one image area at a time, a rotatable disc carried by said support below said guide, a plurality of loading stations arranged in spaced relation on said disc, a holder slidably mounted on said disc at each of said stations to receive a stereo mount and formed with a pair of aligned spaced apertures, means to rotate said disc intermittently to bring said stations successively into aligned relation with said guide to receive the severed transparencies which are positioned on the mounts at said stations in proper aligned and stereo relation, means to hold said disc releasably in position when a station is in image receiving position, means to tack the severed transparencies on the mounts and over the apertures thereof in aligned and stereo relation, and means actuated by the rotation of said disc to operate said tacking means and said feeding means in timed relation.

References Cited in the file of this patent

UNITED STATES PATENTS 2,718,975    Bower _____ Sept. 27, 1955